United States Patent
Corder et al.

(10) Patent No.: US 7,338,010 B2
(45) Date of Patent: Mar. 4, 2008

(54) AIR-LAUNCHABLE AIRCRAFT AND METHOD OF USE

(75) Inventors: David A. Corder, Tucson, AZ (US); Jeffrey H. Koessler, Tucson, AZ (US); George R. Webb, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 171 days.

(21) Appl. No.: 10/951,041

(22) Filed: Sep. 23, 2004

(65) Prior Publication Data

US 2005/0218260 A1 Oct. 6, 2005

Related U.S. Application Data

(60) Provisional application No. 60/542,612, filed on Feb. 7, 2004.

(51) Int. Cl.
*B64C 3/56* (2006.01)

(52) U.S. Cl. ............... 244/3.28; 244/46; 244/3.24; 89/1.815

(58) Field of Classification Search ............ 244/137.1, 244/49, 45 R, 3.24, 3.27, 3.28, 3.29, 46, 244/190; 102/400; 89/1.815
See application file for complete search history.

(56) References Cited

U.S. PATENT DOCUMENTS

| | | | |
|---|---|---|---|
| 3,744,741 A | | 7/1973 | Christian et al. |
| 4,106,727 A | * | 8/1978 | Ortell .......................... 244/49 |
| 4,601,442 A | | 7/1986 | Friedel et al. |
| 5,671,899 A | | 9/1997 | Nicholas et al. |
| 6,056,237 A | * | 5/2000 | Woodland .................. 244/3.15 |
| 6,392,213 B1 | | 5/2002 | Martorana et al. |
| 6,880,780 B1 | * | 4/2005 | Perry et al. ................. 244/3.27 |

FOREIGN PATENT DOCUMENTS

GB        2154715        11/1985

OTHER PUBLICATIONS

AIAA-2001-0127, Development of the Black Widow Micro Air Vehicle, Joel M. Grasmeyer and Mattew T. Keennon.*

* cited by examiner

*Primary Examiner*—Timothy D. Collins
(74) *Attorney, Agent, or Firm*—Renner, Otto, Boisselle & Sklar, LLP

(57) ABSTRACT

An air-launched aircraft includes deployable wings, elevons, and vertical fins that deploy from a fuselage during flight. The aircraft may include a control system for operating the elevons, a communication system, and batteries for powering the systems. In addition, the aircraft may include a payload module that mates with an interface in the fuselage. The payload module may include any of a variety of payloads, including cameras, sensors, and/or radar emitters. The aircraft may be powered or unpowered, and may be very small, for example, less than on the order of 10 kg (22 pounds). The aircraft may be employed at a low cost for any of a wide variety of functions, such as surveillance, or as a decoy. The deployable surfaces of the aircraft may be configured to deploy in a pre-determined order, allowing the aircraft automatically to enter controlled flight after being launched in a tumbling mode.

24 Claims, 7 Drawing Sheets

US 7,338,010 B2

AIR-LAUNCHABLE AIRCRAFT AND METHOD OF USE

This application claims priority to U.S. Provisional Application No. 60/542,612, filed Feb. 7, 2004, which is incorporated herein by reference in its entirety.

BACKGROUND OF THE INVENTION

1. Technical Field

The invention relates generally to unmanned aircraft or air vehicles.

2. Description of Related Art

There has been increasing use of pilotless drone aircraft for certain military missions, such as missions in hostile environments. Although the use of pilotless aircraft has certain advantages, principal of which is the elimination of threat to human life, such pilotless drones are still costly to build and operate, since they must contain essentially all of the systems of a regular aircraft. Accordingly, it will be appreciated that it would be desirable to reduce the cost and increase the flexibility of such systems, at least in the performance of some missions.

SUMMARY OF THE INVENTION

According to an aspect of the invention, an air-launched aircraft includes: a fuselage; deployable wings that are coupled to the fuselage; and deployable control surfaces that are coupled to the fuselage. The aircraft has a total weight of less than about 20 kg (44 pounds).

According to another aspect of the invention, a method of deploying an air-launched aircraft, includes the steps of: launching the aircraft in a tumbling flight regime; and bringing the aircraft into a controlled-flight regime by deploying control surfaces and lift-producing surfaces of the aircraft in a predetermined order.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, which are not necessarily to scale:

FIGS. 16-18A are oblique views showing steps in the deployment of the vertical fins of the aircraft of FIG. 1;

DETAILED DESCRIPTION

An air-launched aircraft includes deployable wings, elevons, and vertical fins that deploy from a fuselage during flight. The aircraft may include a control system for operating the elevons, a communication system, and batteries for powering the control and communication systems. In addition, the aircraft may include a payload module that mates with an interface in the fuselage. The payload module may include any of a variety of payloads, including cameras, sensors, and/or radar emitters. The aircraft may be powered or unpowered, and may be very small, for example, less than on the order of 10 kg (22 pounds). The aircraft may be employed at a low cost for any of a wide variety of functions, such as surveillance, or as a decoy. The functions of the aircraft may be fulfilled during its flight, and/or after landing on the ground or other surface. The deployable surfaces of the aircraft may be configured to deploy in a pre-determined order, allowing the aircraft automatically to enter controlled flight after being launched in a tumbling mode.

Figure 1:
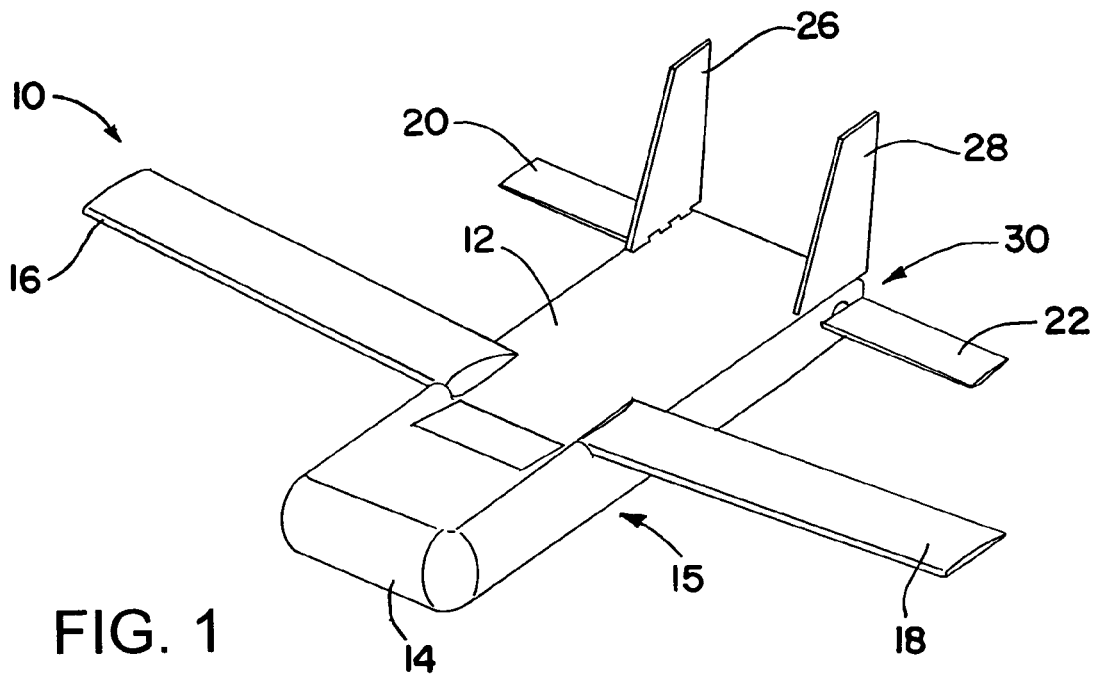
FIG. 1 is an oblique view of an aircraft in accordance with the present invention.
Figure 2:
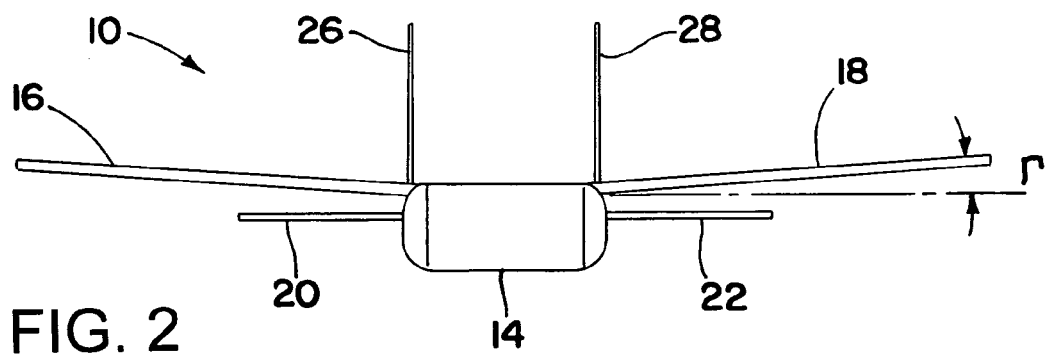
FIG. 2 is a front view of the aircraft of FIG. 1.
Figure 3:
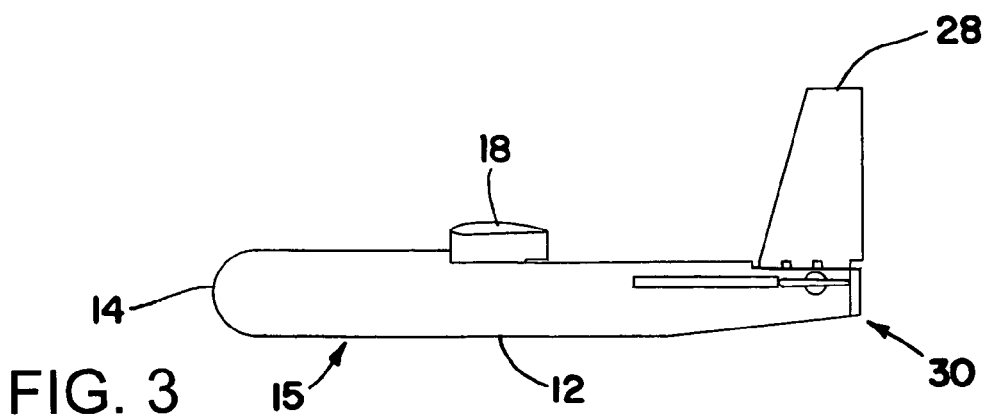
FIG. 3 is a side view of the aircraft of FIG. 1.

Turning initially to FIGS. 1-3, an aircraft 10 has a fuselage 12 that has a payload module 14 coupled to it at a forward end 15 of the payload module 14. The aircraft 10 has a number of deployable surfaces that may be deployed during flight to produce lift and/or to control flight of the aircraft 10. These surfaces include a pair of wings 16 and 18, a pair of elevons 20 and 22, and a pair of vertical fins 26 and 28.

The wings 16 and 18 provide lift for maintaining the flight of the aircraft 10. As best seen in FIG. 2, the wings 16 and 18 may be canted upward, having a dihedral angle F as they slope up and away from the fuselage 12. Having upward-canted wings helps maintain stability in the fuselage 12. Once deployed, wings 16 and 18 may be held fixed in place relative to the fuselage 12.

All of the control of the aircraft 10 may be provided by the elevons 20 and 22, which are mounted on an aft end 30 of the fuselage 12. It will be appreciated that having the elevons 20 and 22 be the only control surfaces on the aircraft 10 does place some limits on the maneuverability of the aircraft 10. However, by keeping the number of movable control surfaces to a minimum, cost, weight, and complexity of the aircraft 10 may be reduced.

The vertical fins 26 and 28 provide directional stability for the aircraft 10. As described in greater detail below, the vertical fins 26 and 28 are hinged where they join to the fuselage 12. Spring forces are used to deploy the fins 26 and 28 during flight, and to mechanically lock the fins 26 and 28 into place. The elevons 20 and 22 and the vertical fins 26 and 28 are collectively referred to herein as "tail surfaces."

Figure 4:
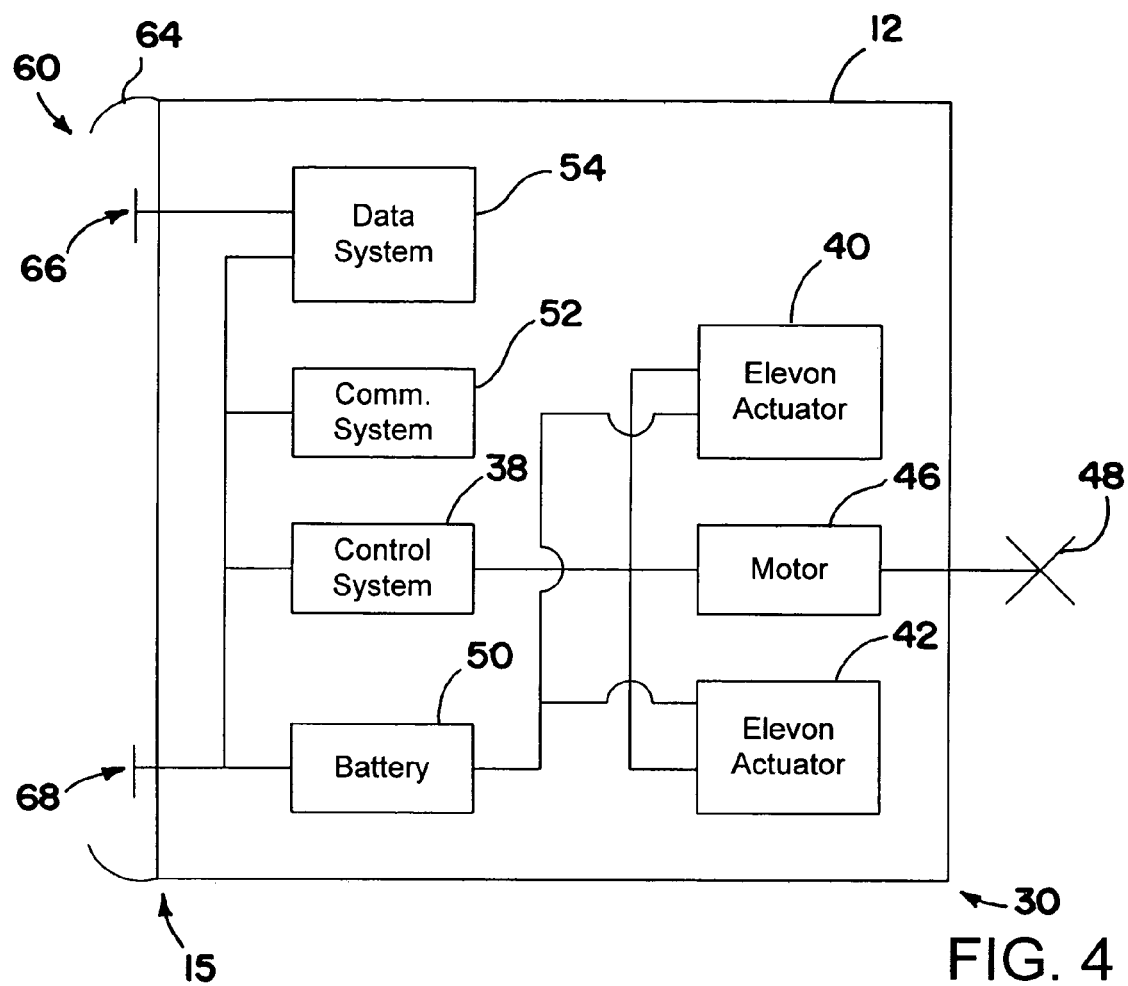
FIG. 4 is a schematic diagram of functional parts of the fuselage of the aircraft of FIG. 1.

FIG. 4 shows a schematic view of possible interior structures of the fuselage 12. The fuselage 12 may have a control system 38 that is operatively coupled to elevon actuators 40 and 42 that are used to tilt the elevons 20 and 22 to control flight of the aircraft 10. The control system 38 may include such devices as an inertia guidance system and a global positioning system (GPS). The controller or control system 38 also may be coupled to an electric motor 46, which may be used to turn a propeller 48. The propeller 48 may be located on the aft end 30 of the fuselage, in order to provide powered flight to the aircraft 10. It will be appreciated that the electric motor 46 and the propeller 48 may be optional, in that they may be excluded altogether, making the aircraft 10 a glider that flies unpowered. Thus, the aircraft 10 may engage in either unpowered or powered flight.

A battery 50 provides power to the elevon actuators 40 and 42, the motor 46, and the control system 38. The battery 50 may also be used for providing power to a communication system 52 and a data collection and storage system 54. The battery 50 may include a variety of suitable lightweight batteries, such as nickel metal hydride batteries. The communication system 52, which may be coupled to the control system 38 and/or the data control system 54, may be used to communicate with systems outside of the aircraft 10. For instance, the communication system 52 may be used to communicate with ground bases, other aircraft, ships, satellites, or other suitable objects. The communication system 52 may be used for sending or receiving data of any of a wide variety of types. For example, the communication system 52 may be used to receive data regarding control of the aircraft 10, for instance, by sending instructions or course information regarding a destination of the aircraft 10. Also, the communication system 52 may be used for sending information, such as information regarding the location of the aircraft 10, information regarding sensor readings perceived by the aircraft 10, and/or information from photographs taken by the aircraft 10. Data received and/or to be sent by the communication system 52 may be stored in the data system 54.

The fuselage 12 includes an interface 60 on the forward end 15 of the fuselage 12. The interface 60 may include a mechanical interface 64 for coupling the payload module 14 (FIG. 1) to the fuselage 12. The mechanical interface 64 may include any of a variety of types of suitable mechanical interfaces. As one example, the mechanical interface 64 may include a plurality of threaded holes for aligning with holes of the payload module 14, and for receiving threaded fasteners such as bolts for coupling the payload module 14 to the fuselage 12. It will be appreciated that a wide variety of other types of mechanical couplings may be utilized.

The interface 60 may also include a data interface 66 and an electrical interface 68. The data interface may be coupled to the data system 54 for receiving and/or transmitting data from the data system 54 to the payload module 14. The electrical interface 68 may be coupled to the battery 50, so as to provide electrical power to the payload module 14.

The aircraft 10 may have a wingspan from about 10 cm to about 2.4 m (about 4 to 96 inches). The weight of the aircraft 10 may be less than about 20 kg (44 pounds), may be less than about 5 kg (11 pounds), and may be less than about 2 kg (4.4 pounds). It will be appreciated that a small size and weight may be useful in allowing the aircraft 10 to be deployed from a variety of launch platforms, for example, many lightweight copies of the aircraft 10 may be stored aboard a single large aircraft, for dispersion one at a time or in groups. Also, the small size and/or light weight of the aircraft 10 may facilitate its being placed aboard relatively small other types of aircraft, such as missiles.

It will be appreciated that the center of gravity of the aircraft 10 may be controlled to help maintain stability of the aircraft. For example, the center of gravity of the aircraft 10 may be located between the wings 16 and 18.

The aircraft 10 may have an ability to maintain flight for about 30 to 60 minutes at an altitude of approximately 9,100 meters (30,000 feet). However, it will be appreciated that the aircraft 10 may have other performance attributes.

Figure 5:
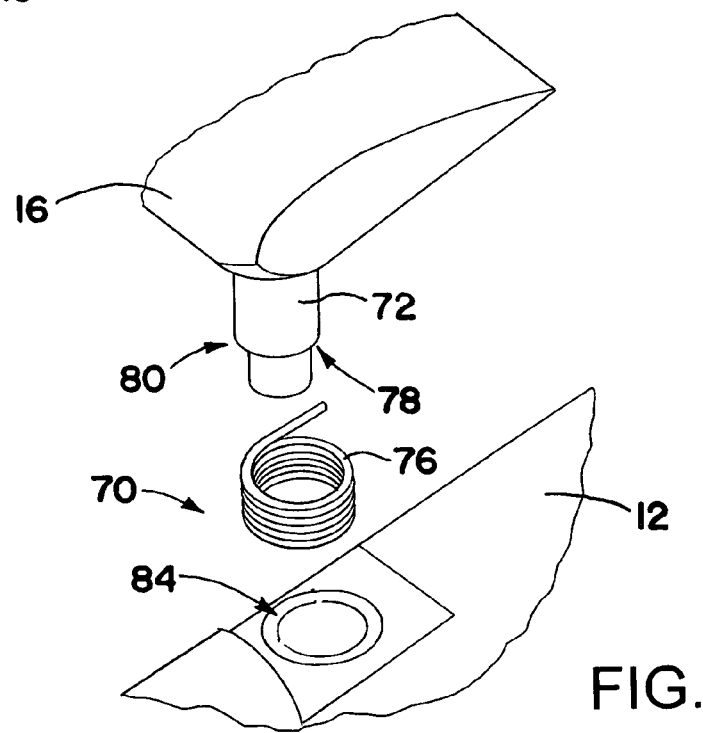
FIG. 5 is an oblique exploded view showing components of a wing deployment system of the aircraft of FIG. 1.
Figure 6:
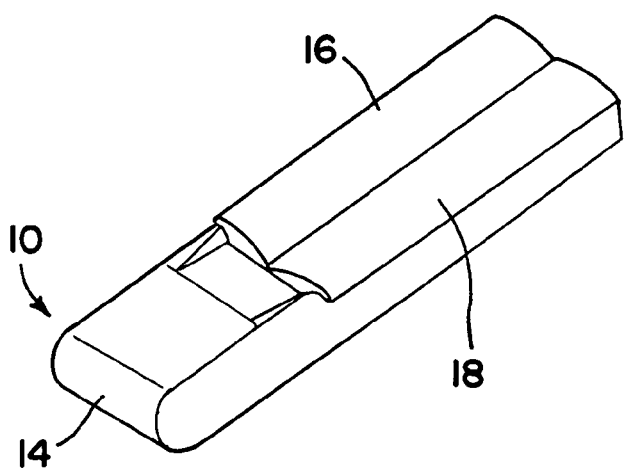
FIGS. 6-9 are oblique views showing steps in the deployment of the wings, utilizing the wing deployment system of FIG. 5.

FIG. 5 illustrates a wing deployment system 70 for the wing 16 from a stowed position to a deployed position. It will be appreciated that a similar wing deployment system may be utilized for deploying the wing 18, and in fact, the deployment systems may be considered a single deployment system for deploying both of the wings 16 and 18.

The wing 16 has an attached shaft 72. The shaft 72 is not in general perpendicular to the wing 16, but rather is angled relative to the wing 16, such that rotation of the shaft 72 about its axis shifts the wing from a stowed position, in contact with and parallel to the top of the fuselage 12, to a deployed position, at the dihedral angle ⌈ (FIG. 2).

A drive spring 76 may employ both torsion and compression forces to deploy the wing 16. The drive spring 76 fits around the shaft 72. One end of the drive spring 76 engages the hole 78 in a stepped portion 80 of the shaft 72. The other end of the drive spring 76 engages a hole in a recess 84 into which the drive spring 76 and the shaft 72 are placed. The end of the drive spring 76 may engage a bearing or other hardened portion, instead of directly engaging the fuselage 12 within the recess 84.

The wing deployment system 70 may be configured such that the deployment of the wing 16 occurs automatically upon launch of the aircraft 10. That is, while in the stowed position, the wing 16 may be restrained only by a launch container which the aircraft is in. Once the aircraft 10 emerges from the launch container, there may be no force that constrains the wing 16 from turning about an axis of its shaft 72, under the influence of the drive spring 76 which is under torsion within the recess 84, while the wing 16 is in the stowed position.

Upon the wing 16 reaching its deployed position, the spring 76 may draw the shaft 72 deeper into the recess 84, engaging a locking mechanism to lock the wing 16 in place in its deployed position. The locking mechanism may include any of a variety of suitable mechanical locking mechanisms, such as engagement of a protrusion or pin on one part with a corresponding recess on another part. It will be appreciated that there may be more than one wing position lock for locking the wings 16 and 18 in different positions. For example, there may be a first wing lock that temporarily locks the wings 16 and 18 in an intermediate position, between the stowed position and the deployed position, for obtaining initial stability of the aircraft 10 upon launch. Later, this first wing position lock may be overcome, with the wings 16 and 18 progressing to their fully deployed position, and being locked into place there by a second position lock. The first wing position lock may be disengaged by any of a variety of suitable mechanisms, electromechanical or purely mechanical mechanisms, which may be controlled either electronically and/or mechanically.

Further details regarding use of a torsion spring to deploy a wing by rotation about a single axis may be found in co-owned U.S. patent application Ser. No. 11/043870, which is herein incorporated by reference in its entirety.

Figure 7:
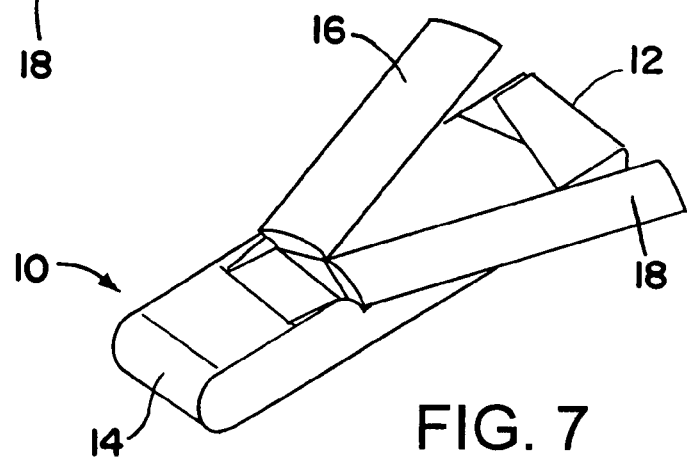
Figure 8:
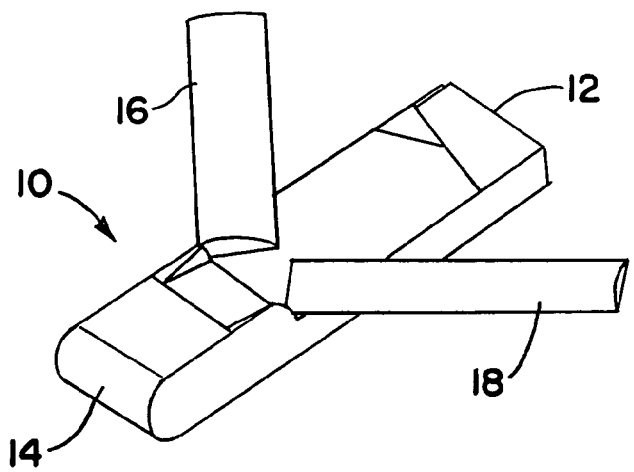
Figure 9:
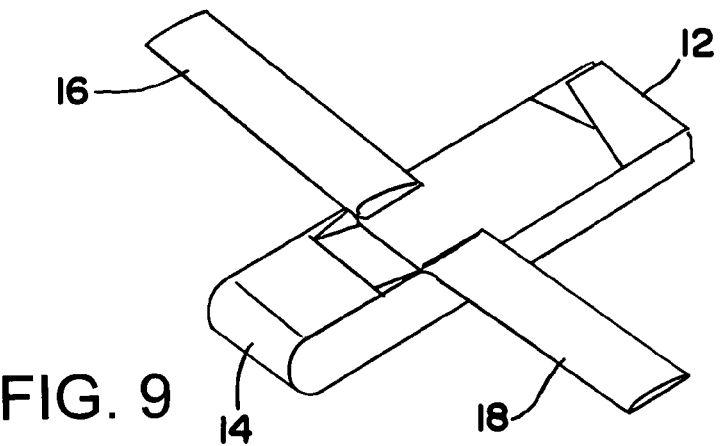

FIGS. 6-9 show a progression of deployment of the wings 16 and 18, from a stowed position (FIG. 6) to a fully deployed position (FIG. 9). FIGS. 7 and 8 show the wings 16 and 18 in partially deployed positions. As noted above, intermediate locking mechanisms may be used to temporarily lock the wings 16 and 18 in the partially deployed positions.

Figure 10:
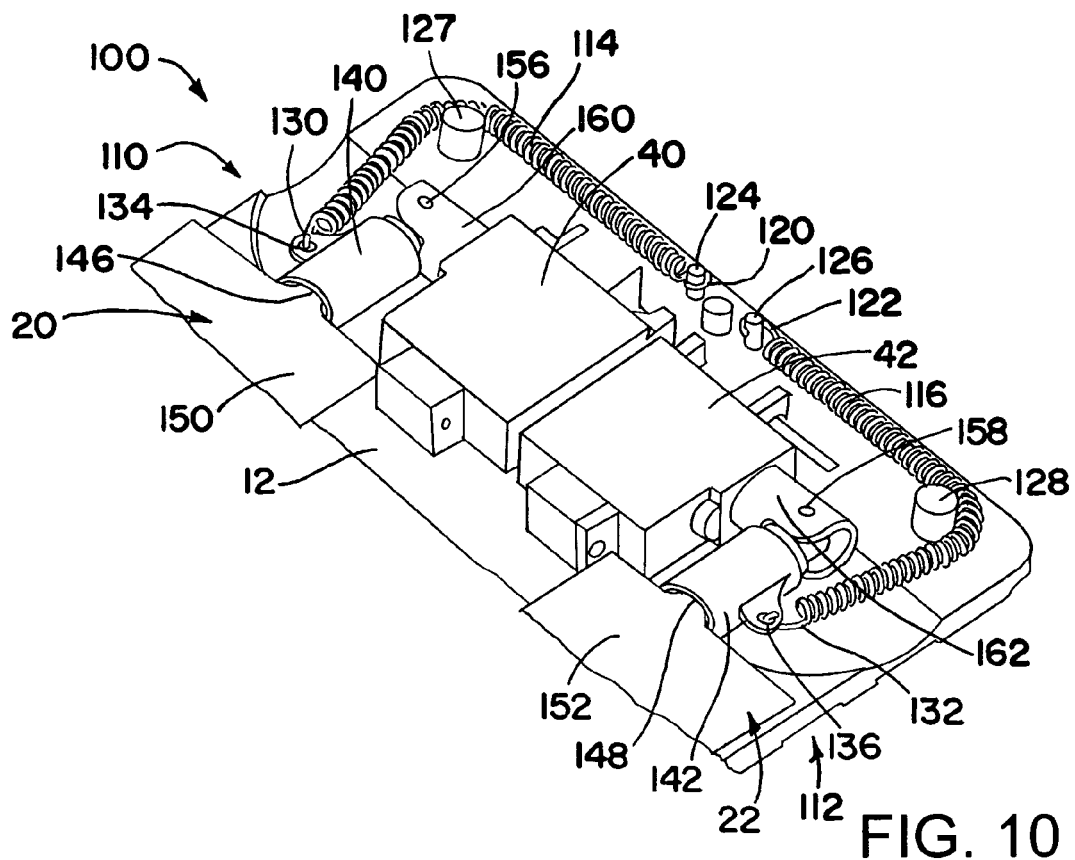
FIG. 10 is an oblique cutaway view showing components of an elevon deployment system of the aircraft of FIG. 1, with the elevons in a stowed configuration.

FIG. 10 shows an elevon deployment system 100 for deploying the elevons 20 and 22. The elevons 20 and 22 deploy from inside slots 110 and 112 in the fuselage 12. The elevons 20 and 22 are deployed through use of tension springs 114 and 116. At one end, the springs 114 and 116 are fixedly coupled to the fuselage 12, with hooks 120 and 122 of the springs 114 and 116 engaging pins 124 and 126 of the fuselage 12. The springs 114 and 116 pass around pivot pins 127 and 128, and the far ends of the springs have hooks 130 and 132 that engage respective holes 134 and 136 in bearings 140 and 142. The bearings 140 and 142 surround respective shafts 146 and 148 of the elevons 20 and 22. The shafts 146 and 148 are fixable coupled to blades 150 and 152 of the elevons 20 and 22.

Upon release of the aircraft 10 from a launch tube, tension in the springs 114 and 116 pulls on the holes 134 and 136 in the bearings 140 and 142. This rotates the elevon shafts 146 and 148 about respective pins 156 and 158 that rotationally couple the elevons 20 and 22 to actuator shafts 160 and 162 that are actuated by the servo-actuators 40 and 42.

Figure 11:
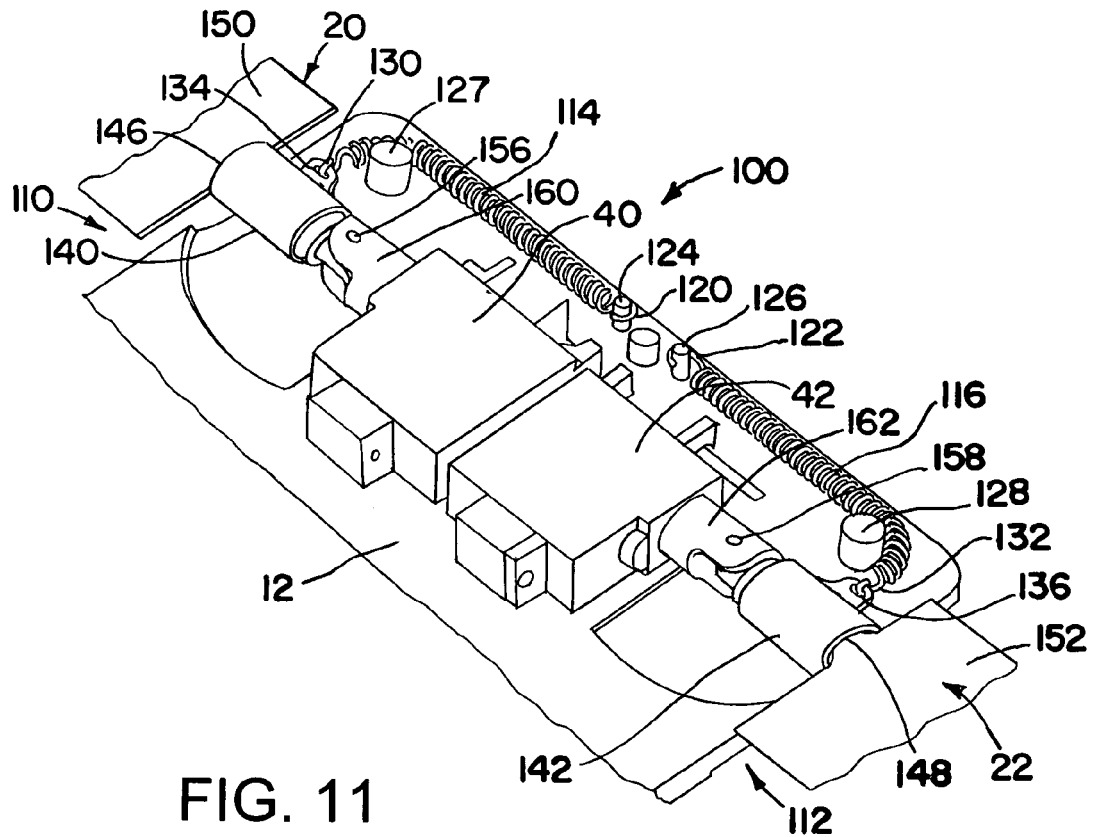
FIG. 11 is an oblique cutaway view of the elevon deployment system of the aircraft of FIG. 10, with the elevons in a deployed configuration.

Once the elevons 20 and 22 are fully deployed, as illustrated in FIG. 11, the bearings 140 and 142, and/or the elevon shafts 146 and 148, are mechanically locked to the actuator shafts 160 and 162. The elevons 20 and 22 may then be actuated by the servo-actuators 40 and 42. The servo-actuators 40 and 42 cause the actuator shafts 160 and 162 to rotate. The actuator shafts 160 and 162 in turn are mechanically locked with the elevon shafts 146 and 148, so movement of the actuator shafts 160 and 162 causes the elevons 20 and 22 to rotate, allowing maneuver of the aircraft 10.

Figure 12:
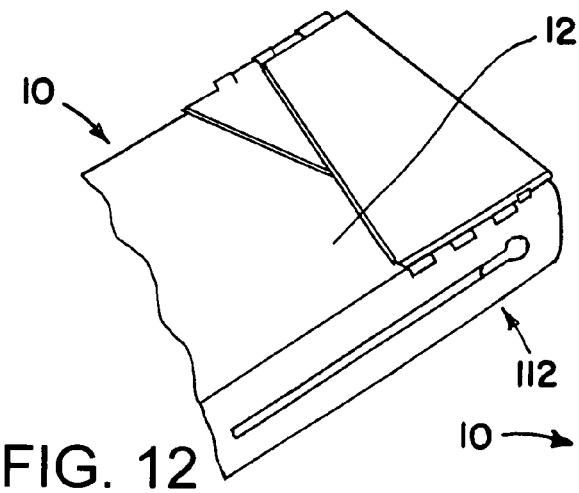
FIGS. 12-15 are oblique views showing steps in the deployment of the elevons, utilizing the elevon deployment system of FIGS. 10 and 11.
Figure 13:
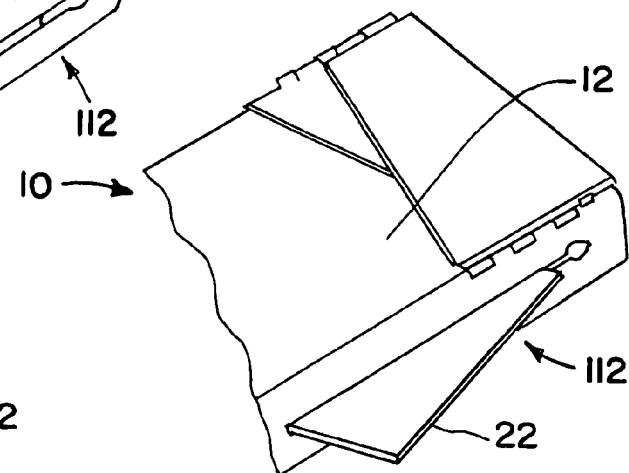
Figure 14:
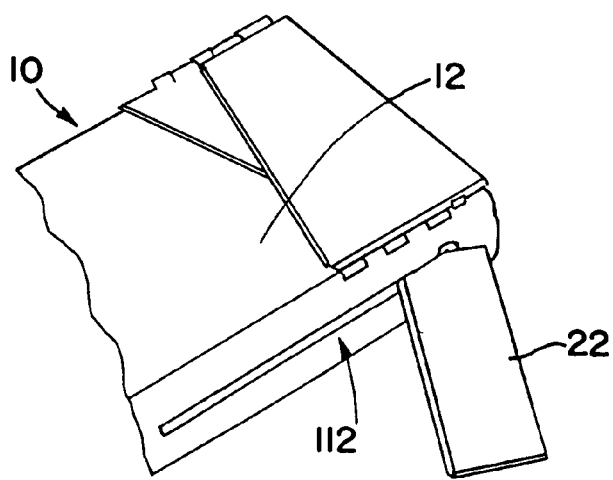
Figure 15:
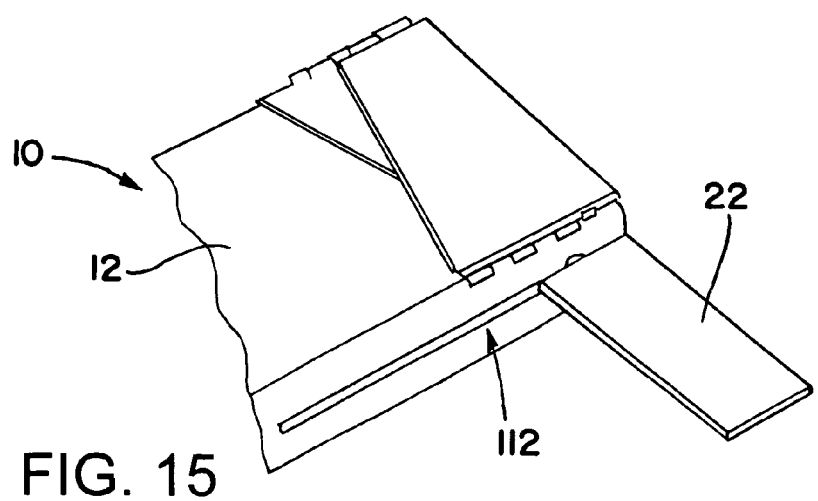
Figure 16:
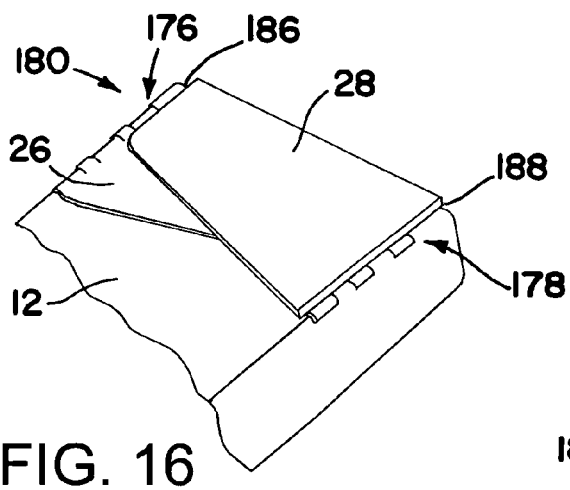

FIGS. 12-15 show steps in the deployment of the elevons 20 and 22. FIG. 12 shows the deployed configuration, with the elevon 22 in the slot 112. FIGS. 13 and 14 show the elevon 22 partially deployed. It will be appreciated that the elevons 20 and 22 are not rotatable to control the aircraft 10 while in the partially deployed position shown in FIGS. 13 and 14, due to portions of the elevon blades 150 and 152 still remaining in the respective slots 110 and 112. FIG. 15 shows the elevon 22 fully deployed, and able to be actuated by the elevon actuator 42 (FIGS. 10 and 11). The elevon shafts may be held in the opened position by the deployment spring and aerodynamic forces.

It will be appreciated that other sorts of elevon deployment systems may be used as an alternative to the elevon deployment system 100 shown in FIGS. 10 and 11 and described above. For example, electrical or other mechanical forces may be used to deploy the elevons 20 and 22. However, it will be appreciated that the elevon deployment system 100 described above has the virtues of simplicity and light weight. In addition, it will be appreciated that it is advantageous to have a deployment system that does not require use of aircraft power.

Figure 17:
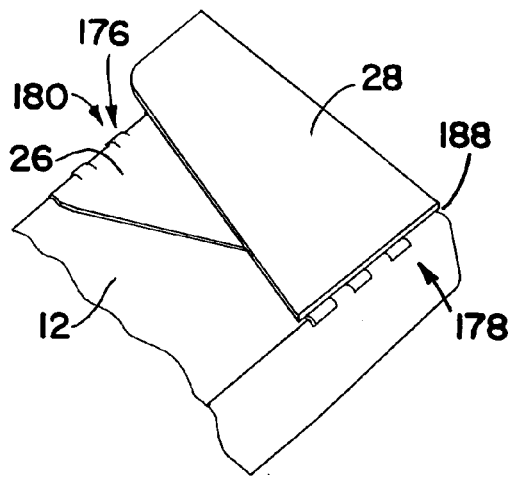
Figure 18A:
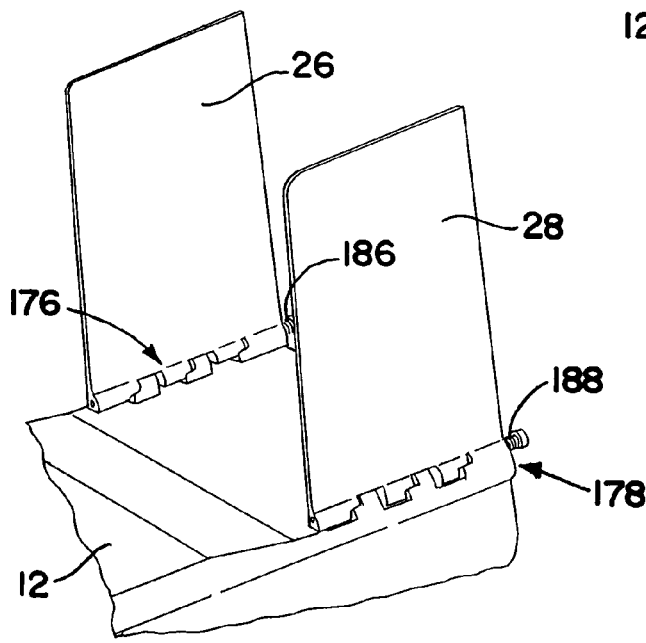
Figure 18B:
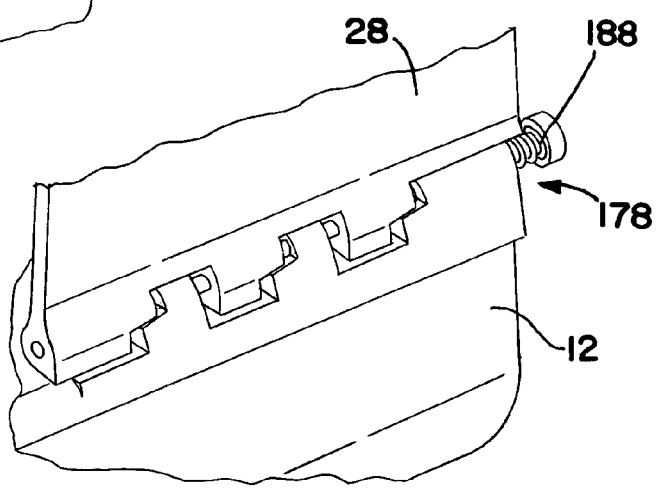
FIG. 18B is an oblique view showing details of a locking mechanism of for the vertical fins.

FIGS. 16-18B illustrate deployment of the vertical fins 26 and 28. The fins 26 and 28 are hingably coupled to the fuselage 12 at hinges 176 and 178. A fin deployment system 180 includes a pair of torsion-compression springs 186 and 188 that are used to rotate the fins 26 and 28 relative to the fuselage 12, from a stowed position to a deployed position. Once the fins 26 and 28 are in the deployed position, compression forces in the springs 186 and 188 engage rotation locks, locking the fins 26 and 28 in their deployed position. One end of each of the springs 186 and 188 is fixedly attached to the fuselage 12. The other end is fixedly attached to the fins 26 and 28, at or near the hinges 176 and 178. The springs 186 and 188 are configured such that there is a torsional force upon the fins 26 and 28 when the fins are in the stowed position. Once the fins 26 and 28 are free to move, such as when the aircraft 10 exits a storage container or launcher, the torsion forces from the springs 186 and 188 act upon the vertical fins 26 and 28 to begin rotation of the fin, as is illustrated in FIG. 17. These torsion forces continue to act upon the vertical fins 26 and 28 until the fins reach their fully deployed position, illustrated in FIG. 18A. Once the fins 26 and 28 reach their fully deployed position, the fins 26 and 28 encounter rotation stops that prevent further rotation of the fins 26 and 28. Thereafter, compression forces in the springs 186 and 188 force the vertical fins 26 and 28 aftward along the hinges 176 and 178, causing the vertical fins 26 and 28 to engage mechanical stops that maintain them in their deployed position. FIG. 18B shows details of the locking mechanism that maintains the fin 28 in the deployed position.

Figure 19:
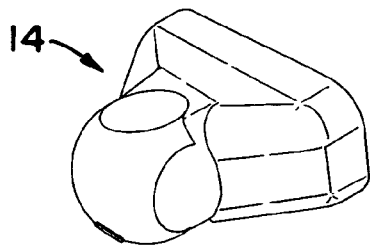
FIG. 19 is an oblique view showing one configuration of a payload module that configured for use as part of the aircraft of FIG. 1.
Figure 20:
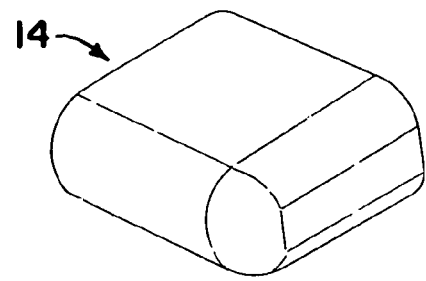
FIG. 20 is an oblique view showing another configuration of a payload module that configured for use as part of the aircraft of FIG. 1.

FIGS. 19 and 20 show a pair of possible configurations for the payload module 14. As stated earlier, the payload module 14 includes any of a variety of devices, such as sensors, cameras, or radar emitters. The payload module 14 may be configured to mate with the interface 60 (FIG. 4), thus conforming to mechanical, electrical and/or data interface requirements of the fuselage 12. In addition, the payload module 14 may be configured to conform to certain requirements, such as fitting within predetermined dimensionable boundaries, and being within predetermined parameters for weight and location of center of gravity.

Figure 21:
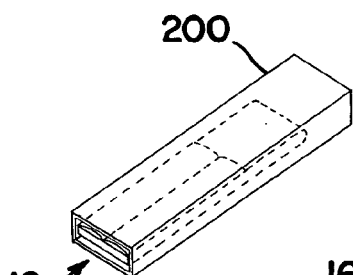
FIGS. 21-23 are oblique views showing steps in the launch of the aircraft of FIG. 1 from a launch canister.
Figure 22:
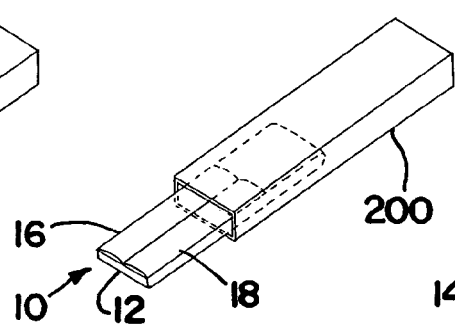
Figure 23:
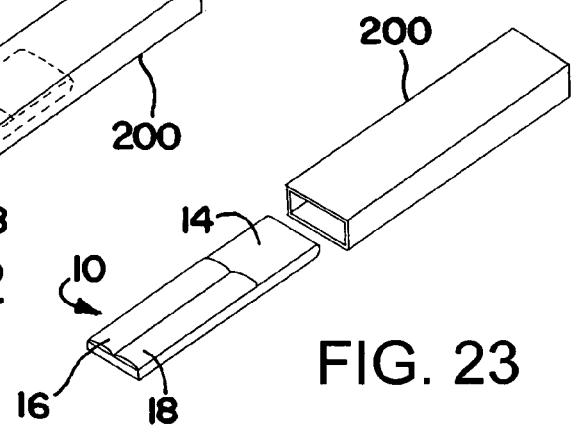

Turning now to FIGS. 21-23, the aircraft 10 may be launched from a container or launch canister 200. When initially launched, the wings 16 and 18, the elevons 20 and 22, and the vertical fins 26 and 28 are all in a stowed configuration. The aircraft 10 may be air-launchable in substantially any orientation relative to the flight of the platform (aircraft or missile) from which it is launched. The initial tumbling mode of flight may be a desirable feature in the launch of the aircraft 10. This is because the initial velocity of the aircraft 10 when air launched (for example, from about Mach 0.8 to Mach 0.95) may be so great that it would cause damage to the deployable surfaces if they were in their fully deployed positions. A period of tumbling during the deployment may allow the aircraft 10 to slow sufficiently such that the control and lift-producing surfaces are not damaged when they reach full deployment. Put another way, initially launching the aircraft 10 in a tumbling mode of flight allows the lift-producing and control surfaces to be made lighter and less robust, because they encounter less stress.

In one possible sequence of events, the aircraft may be initially launched in the tumbling configuration. As the tumbling slows the aircraft 10, the vertical fins 26 and 28 may be deployed. Deployment of the vertical fins 26 and 28 may aid in slowing down or stopping spinning of the aircraft 10 during the tumbling.

Following deployment of the vertical fins 26 and 28, the elevons 20 and 22 may be deployed to further stop the spin, and to bring the aircraft 10 into a nose down position.

Following deployment of the tail surfaces, and bringing the aircraft 10 into a nose down position, the wings 16 and 18 may be partially or fully deployed to bring the aircraft 10 into stable, controlled flight. The wings 16 and 18 may be deployed in two stages, with a partial deployment, such as in FIG. 7 or 8, done first, followed by a full deployment of the wings 16 and 18 to the configuration shown in FIG. 9.

As described above, then, the deployment process of the aircraft 10 undergoes three basic regimes of flight: 1) tumbling, to initially slow down the aircraft 10 prior to full deployment of the lift-producing and control surfaces; 2) deployment of tail surfaces to stop spinning of the aircraft 10, and to bring the aircraft 10 into a nose-down configuration; and 3) deployment of the wings 16 and 18 to position the aircraft 10 into stable flight. It will be appreciated that the transition may involve different regimes of flight, and/or different orders of deployment of the various lift-producing and control surfaces. For example, partial deployment of the wings 16 and 18 may occur during the deployment of the vertical fins 26 and 28, and/or the elevons 20 and 22.

It will be appreciated that the order of deployment of the lift-producing and control surfaces may be controlled in any of a variety of suitable ways. For example, clamps may be used to hold back certain of the lift-producing and control surfaces from immediate deployment. Suitable actuators, such as suitable electro-mechanical actuators, may be used to control deployment of the lift-producing and control surfaces. Alternatively or in addition, the lift-producing and control surfaces may be configured on the aircraft 10 in such positions as to control their deployment.

Figure 24:
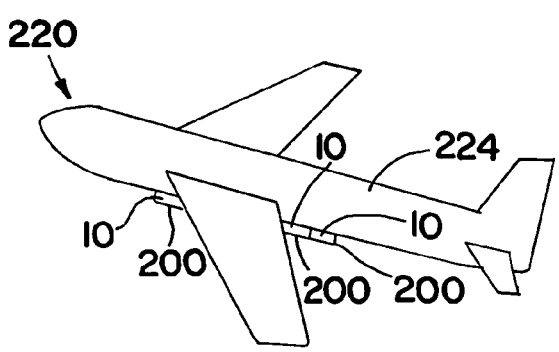
FIG. 24 is an oblique view showing one application of the aircraft of FIG. 1, with the aircraft coupled to an airplane.

FIG. 24 shows one possible application of the aircraft 10. As shown in the figure, an airplane 220 has multiple of the aircraft 10 mounted thereupon or therewithin. The aircraft 10 may be launched individually or groups from the airplane 220 for any of a variety of purposes. The aircraft may be mounted in any of a variety of suitable places on the airplane 220. For example, as shown, the aircraft 10 may be configured to launch from their launch canisters 200 in a sideways direction, relative to the airplane 220. The launch canisters 200 may be mechanically coupled to a fuselage 224 of the airplane 220. The aircraft 10 may be launched as decoys, for gathering data in the air or on the ground utilizing cameras and/or other sensors, or may be used to emit radar signals or other signals, either in the air or on the ground.

Figure 25:
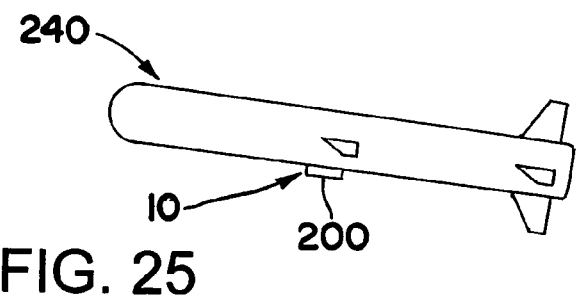
FIG. 25 is an oblique view showing another application of the aircraft of FIG. 1, with the aircraft coupled to a missile.

FIG. 25 shows another possible use for the aircraft 10. As shown, the launch canister 200 of a camera-equipped aircraft 10 is mounted to a missile 240, such as a cruise missile. During flight of the missile 240, as the missile 240 nears its target, the aircraft 10 is launched from the canister 200. After the missile 240 has impacted its target, the aircraft 10 may be used to take a picture of the target area, and transmit it back to a receiving station (which may be ground based, air based, or sea based) to provide information regarding the target's condition.

In summary, the present invention provides a small, lightweight, and low cost aircraft which may be air launched for use in any of a variety of suitable missions. The aircraft may be flexible, in that the modular payloads can be used to configure it for any of a variety of missions. The aircraft may be cheap and easily expendable, allowing large numbers to be utilized for dangerous missions, such as gathering data in hostile environments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An air-launched aircraft comprising:
a fuselage;
deployable wings that are coupled to the fuselage; and
deployable control surfaces that are coupled to the fuselage;
wherein the aircraft has a total weight of less than 20 kg (44 pounds);
wherein the deployable control surfaces include elevons;
wherein the elevons constitute substantially all of the deployable control surfaces;
wherein the elevons are aft of the wings; and
wherein the elevons deploy from slots in the fuselage.

2. The aircraft of claim 1, further including a pair of deployable vertical fins that are coupled to the fuselage.

3. The aircraft of claim 1, further comprising springs within the fuselage that rotate the elevons from a stowed configuration to a deployed configuration.

4. The aircraft of claim 1, wherein the wings are upwardly canted.

5. The aircraft of claim 4, wherein the wings are configured to deploy from a stowed position by single-axis rotation about respective shafts of the wings.

6. The aircraft of claim 1, further comprising vertical fins hingedly coupled to the fuselage.

7. The aircraft of claim 1, wherein the aircraft is an unpowered glider.

8. The aircraft of claim 1, wherein the aircraft is configured for powered flight, with the aircraft having a battery-powered propeller coupled to the fuselage.

9. The aircraft of claim 8, wherein the propeller is mounted to an aft end of the fuselage.

10. The aircraft of claim 1, wherein the aircraft has a total weight of less than 5 kg (11 pounds).

11. The aircraft of claim 1, wherein the aircraft has a total weight of less than 2 kg (4.4 pounds).

12. The aircraft of claim 1, wherein the control surfaces are operatively coupled to a control system that is in the fuselage.

13. The aircraft of claim 1, further comprising a payload module coupled to the fuselage.

14. The aircraft of claim 13,
wherein the fuselage includes a payload interface for coupling the payload to the fuselage; and
wherein the payload interface includes a data interface and an electrical interface.

15. The aircraft of claim 13, wherein the payload module includes a radar emitter.

16. The aircraft of claim 13, wherein the payload module includes a sensor.

17. The aircraft of claim 13, wherein the payload module includes a camera.

18. The aircraft of claim 1, wherein the fuselage includes:
a power supply;
a control system that is operatively coupled to the power supply and the control surfaces; and
a communication system that is coupled to the power supply.

19. The aircraft of claim 18, wherein the power supply includes at least one battery.

20. The aircraft of claim 1, wherein the elevons are single-piece planar control surfaces that tilt in their entirety relative to the fuselage.

21. The aircraft of claim 20, further comprising elevon actuators within the fuselage that are operatively coupled to the elevons to tilt the elevons.

22. The aircraft of claim 21, wherein the elevon actuators are mechanically coupled to elevon shafts of the elevons, to rotate the elevons about the elevon shafts.

23. The aircraft of claim 22, wherein the elevon actuators include actuator shafts that are coupled to the elevon shafts by pins.

24. The aircraft of claim 23,
further comprising an elevon deployment system for deploying the elevons from the slots;
wherein the elevon deployment system includes springs for deploying the elevons by rotating the elevon shafts relative to the actuator shafts, about the pins.

* * * * *